_United States Patent_ [19]

Boden

[11] 4,373,234

[45] Feb. 15, 1983

[54] DEVICE FOR GRIPPING AN ELONGATED FLEXIBLE ELEMENT

[76] Inventor: Ogden W. Boden, 1580 Gaywood Dr., Altadena, Calif. 91001

[21] Appl. No.: 136,406

[22] Filed: Apr. 1, 1980

[51] Int. Cl.³ ............................................. A44B 11/12
[52] U.S. Cl. .................................. 24/191; 24/134 KB
[58] Field of Search ...... 24/134 R, 134 KA, 134 KB, 24/170, 191, 70; 70/440

[56] References Cited

U.S. PATENT DOCUMENTS

| 1,526,606 | 2/1925 | Moloney | 70/440 |
| 2,981,993 | 5/1961 | Elsner | 24/170 |
| 3,020,612 | 2/1962 | Meeker | 24/170 |
| 3,413,691 | 12/1968 | Elsner | 24/170 |

_Primary Examiner_—William H. Schultz
_Assistant Examiner_—Ramon O. Ramirez
_Attorney, Agent, or Firm_—William P. Green

[57] ABSTRACT

A device for gripping an elongated flexible element, such as a flexible belt, and including a first member, an actuating member mounted to swing relative to the first member between locking and released positions, and a locking member connected to the actuating member for swinging movement therewith and acting in the locking position to clamp the elongated element against a gripping portion of the first member in a relation retaining the elongated element against longitudinal movement, with said locking member being free for limited pivotal movement relative to the actuating member in a relation acting to progressively tighten the grip on said elongated element as a result of said pivotal movement of the locking member relative to the actuating member when the latter is in its locking position.

21 Claims, 8 Drawing Figures

DEVICE FOR GRIPPING AN ELONGATED FLEXIBLE ELEMENT

BACKGROUND OF THE INVENTION

This invention relates to improved devices for gripping an elongated flexible element in a manner locking it against longitudinal movement in a predetermined direction. Certain features of the invention are especially useful in buckle devices for holding belts or straps in a locked position. The invention will therefore be described primarily as used in conjunction with such belts or straps, though it will be apparent that the invention in its broader aspects is also applicable to the locking of other types of elongated flexible elements, such as for example flexible cords.

Buckles have heretofore been proposed in which a belt or strap is gripped and locked against longitudinal movement by clamping the belt between two members which are connected together for relative swinging or pivotal movement. As a handle portion of one of the members is manually swung relative to the other member from a released or inactive position to a locking position, the belt is clamped between gripping portions of the two members to prevent longitudinal movement of the belt until the arm is subsequently swung back to its inactive position in which the belt is released.

SUMMARY OF THE INVENTION

The primary purpose of the present invention is to provide a buckle or device having a swinging actuating member, but in which the gripping action is more effective and positive and can take a greater load than in most previously proposed arrangements. This is accomplished in a unique manner acting, when the actuating member is in its locked position, to automatically tighten the gripping action progressively as needed to take whatever load may be exerted on the belt, and to do so without the necessity for movement of the actuating member to adjust or tighten the clamping action when the actuating member is in its locking position. The swinging movement of the actuating member may thus be positively limited at a predetermined position in which it assumes essentially a desired orientation with respect to the body of the device, and any further tightening of the gripping action can be attained without additional swinging movement of the actuating member.

Structurally, these results are attained by provision in the device of a third member acting as a locking member which is connected to the actuating member for swinging movement therewith between its locking and released positions, but which also is free for limited pivotal movement relative to the actuating member when the actuating member is in its locking position. The gripping portion of this locking member may have a periphery which increases in radius with respect to the axis of pivotal movement of the parts, and is desirably eccentric with respect to that axis, to attain the desired automatic tightening effect. Preferably, the locking member has a series of teeth on its periphery for contacting the belt or other elongated flexible element lying in a pattern disposed eccentrically with respect to the defined axis.

BRIEF DESCRIPTION OF THE DRAWINGS

The above and other features and objects of the invention will be better understood from the following detailed description of the typical embodiments illustrated in the accompanying drawings, in which.

DESCRIPTION OF THE PREFERRED EMBODIMENTS

Figure 1:
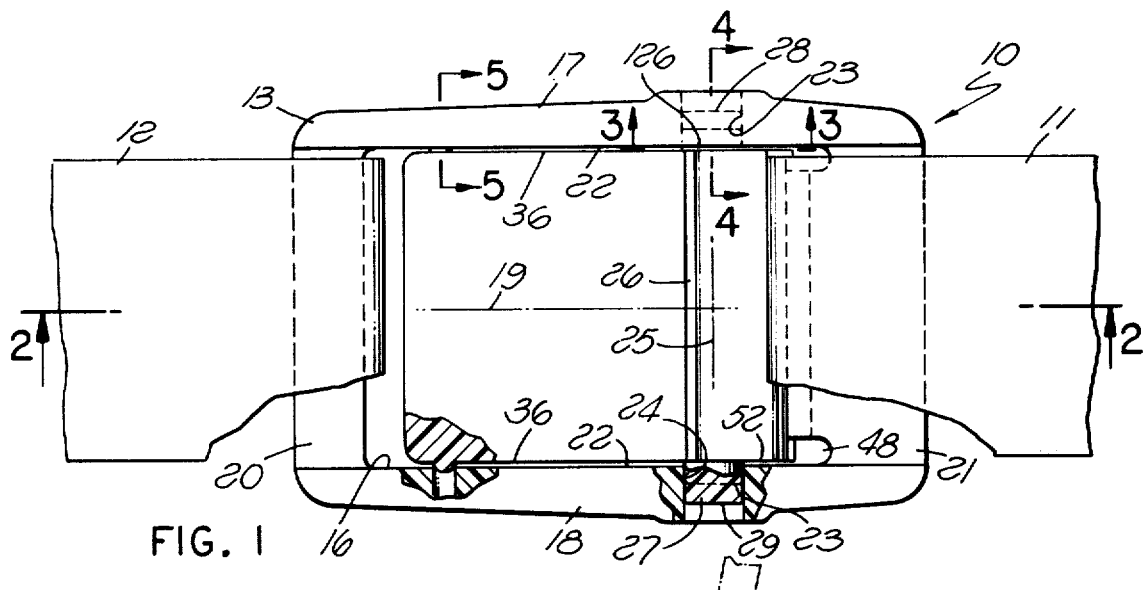
FIG. 1 is a plan view of a first form of buckle constructed in accordance with the invention.

The buckle 10 illustrated in FIGS. 1 to 5 is to be used for adjustably connecting a first belt or belt end 11 to a second belt or belt end 12. It will of course be understood that elements 11 and 12 may be the opposite ends of a single elongated flexible belt or strap. The belts may be formed of any material normally used for such purposes, such as for example nylon webbing, other plastic materials, leather, or the like.

The buckle includes a main body part or member 13, a pivotally movable locking member 14, and a swinging actuating member 15 for moving the locking member 14 between its active and released positions. All three of these parts may be injection molded from an appropriate resinous plastic material, such as for example acetal resins, and are essentially rigid and stiff but have slight resilient deformability to permit assembly of the parts by snapping them together and to attain a snap detenting action for releasably retaining the actuating member in locked position, as will be discussed in greater detail at a later point. The parts all tend by their resilience to return to the shape illustrated in the drawings after being slightly deformed during assembly or in the detenting action.

Body 13 may be shaped as an essentially rectangular frame (FIG. 1), defining a rectangular opening 16 within which the parts 14 and 15 are movably mounted. More particularly, body 13 has two essentially parallel opposite side portions or walls 17 and 18 extending parallel to and spaced equal distances from a central longitudinal axis 19 of the device, and interconnected at their opposite ends by two generally parallel transverse crosspieces or end portions 20 and 21 extending essentially perpendicular to axis 19. At their inner sides, the two portions 17 and 18 of body 10 have vertical planar surfaces 22 disposed parallel to one another and parallel to and equidistant from axis 19. Near the right end of the device as viewed in FIG. 1, the two side portions 17 and 18 of body 10 contain aligned bearing recesses 23 having cylindrical side walls 24 centered about an axis 25 disposed perpendicular to and intersecting axis 19. Actuating member 15 has an externally cylindrical portion 26 at its right end as viewed in FIGS. 1 and 2, whose opposite ends 27 project into the bearing recesses 23 and form stub shafts or bearing pins coacting with the recesses to mount actuating member 15 for swinging movement about axis 25 between the full line active locking position of FIG. 2 and the broken line released position of that figure. To describe portion 26 of part 15 is somewhat greater detail, that portion 26 has an outer cylindrical surface 27 centered about axis 25 and extending at a uniform diameter along the entire length of portion 26 between its opposite end faces 28 and 29. The diameter of external cylindrical surface 27 on portion 26 of part 15 corresponds essentially to or may be slightly less than the diameter of cylindrical side wall surfaces 24 of bearing recesses 23, so that the ends 126 of portion 26 are closely confined and retained within recesses 23 and journaled thereby for the desired pivotal movement about axis 25. In order to enable assembly of the parts 10 and 15 together, each of the end faces 28 and 29 of portion 26 of part 15 may have an upper camming portion 30 (FIG. 4) disposed at an oblique camming angle with respect to a plane 31 perpendicular to axis 25 and adapted to engage a coacting similarly inclined cam surface 32 formed on part 10 beneath the bearing recess 23. Camming surface 30 may form approximately one-half of end face 28, with a lower semi-circular half 33 of that end face lying in the plane 31 perpendicular to axis 25.

Figure 2:
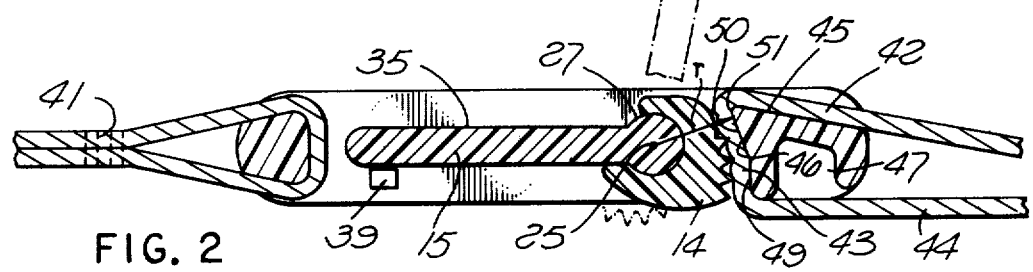
FIG. 2 is a vertical section taken on line 2—2 of FIG. 1.

Extending leftwardly from its portion 26 as viewed in FIGS. 1 and 2, the actuating part 15 has an essentially flat handle portion 35, which is of generally rectangular outline configuration as viewed in FIG. 1 to essentially occupy the rectangular space within body 10 in the locked position of member 15. Handle portion 35 has two opposite side edges 36 extending parallel to axis 19 and received in close proximity to the inner surfaces 22 of portions 17 and 18 of part 10. The vertical sectional configuration of handle 35 may be uniform and as shown in FIG. 2 throughout the entire width of handle 35 between its opposite edges 36. The handle is releasably detented in its FIGS. 1 and 2 locked position by provision of two typically spherically rounded detent lugs 37 on the opposite sides of handle 35 of member 15 (FIG. 5), which lugs are receivable within coacting openings 38 formed in portions 17 and 18 of part 10. As will be understood, during movement of the handle downwardly from the broken line position of FIG. 5 to the full line position of that figure, the detent lugs 37 engage portions 17 and 18 of member 10, and deflect them slightly apart against their resilience, until lugs 37 ultimately fall into recesses 38 at which time the resilience of the side portions 17 and 18 of member 10 returns those side portions to their illustrated positions, to detent actuating member 15 in its locked position until arm 35 is again forceably pushed upwardly from the full line position to the broken line position of FIG. 5 to release the snap action retaining effect. The downward swinging movement of arm 35 is limited in the full line locked position of FIGS. 1, 2 and 5 by engagement of arm 35 with two stop lugs 39 formed on the inner sides of portions 17 and 18 of member 10 and projecting inwardly for engagement of the upper horizontal surfaces of these lugs with the horizontal undersurface of arm 35 at 40.

Belt 12 may be secured to crosspiece 20 of part 10 by extension about that portion 20 as illustrated in FIG. 2, and by retaining the end of the belt in such looped configuration by stitching represented at 41. The second belt or belt end 11 extends across the upper side of crosspiece 21 of member 10 at 42, and then extends downwardly at 43 to a loose end 44 of the belt. In use, tension is exerted on the upper portion 42 of the belt in a rightward direction as viewed in FIG. 2. Crosspiece 21 of body member 10 may have an upper typically inclined surface 45 along which the tensioned portion 42 of the belt extends, and at the left side as viewed in FIG. 2 has a gripping face 46 for contacting the vertically extending portion 43 of the belt. At its underside crosspiece 21 may be recessed as represented at 47, to reduce the weight of member 10 and the amount of material required in its formation. The sectional configuration of crosspiece 21 as viewed in FIG. 2 may be uniform across the entire width of the crosspiece between surfaces 22, except at locations at which the recesses 47 may be interrupted, and at the locations of cut away recesses or notches 48 which may be formed at opposite ends of the crosspiece 21 to avoid interference by the crosspiece with the deflection required of side portions 17 and 18 of member 10 during assembly of the parts. Gripping face 46 of crosspiece 21 may have a lower vertically extending portion 49, lying in a plane perpendicular to axis 19, and an upper inclined portion 50 which advances progressively to the left as it advances upwardly in FIG. 2. These portions 49 and 50 of gripping face 46 define a shallow recess or groove extending axially in that face into which belt 11 is pressed by locking member 14. Both portions 49 and 50 of gripping face 46 advance progressively closer to the pivotal axis 25 of part 15 as they advance upwardly. With regard to the upper inclined portion 50 of that face, it is noted that a radius r extending from axis 25 is perpendicular to the plane of surface area 50 at a location 51 which is preferably at the upper edge of surface 50 and face 46. Thus, the portion of gripping face 46, including both of its portions 49 and 50, which is nearest to axis 25, is along a horizontally extending line at the location 51 near the upper edge of crosspiece 21.

Figures 2A, 4:
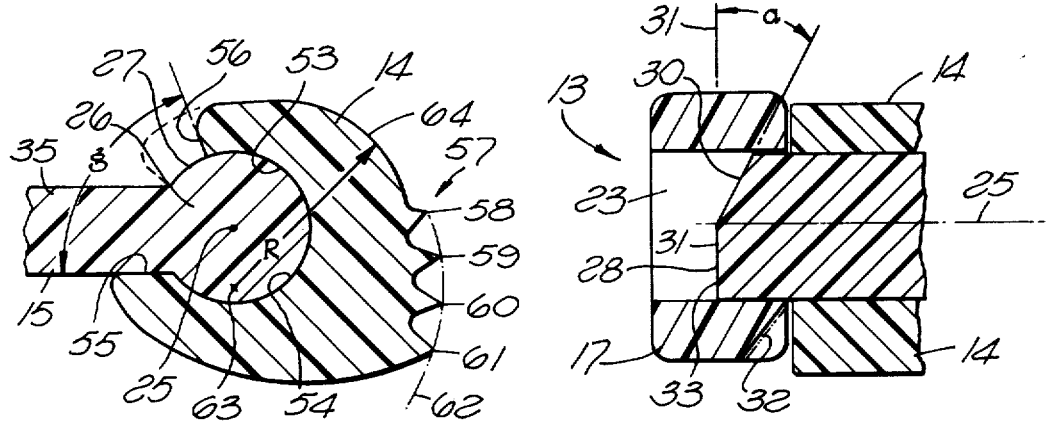
FIG. 2A is an enlargement of a portion of FIG. 2.
FIG. 4 is a fragmentary enlarged vertical section taken on line 4—4 of FIG. 1.
Figure 5:
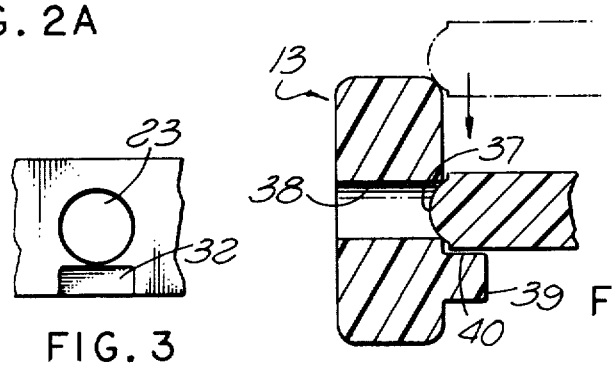
FIG. 5 is a fragmentary enlarged vertical section taken on line 5—5 of FIG. 1.
Figure 3:
FIG. 3 is an enlarged fragmentary view taken on line 3—3 of FIG. 1, and showing one of the bearing recesses in the main body part of the device, as it appears with the swinging actuating member and locking member removed.

Locking member 14 is mounted about portion 26 of actuating member 15 for relative pivotal movement about axis 25 between the full line and broken line relative positions of FIG. 2A. The locking member is of uniform vertical cross-section corresponding to that illustrated in FIG. 2 through the entire length of member 14 between its opposite end surfaces 52 received closely adjacent surfaces 22 of part 10. Internally, member 14 contains a bearing recess 53 having a partial cylindrical inner wall surface 54 of a diameter corresponding to and fitting closely about the outer surface 27 of portion 26 of actuating member 15. At the location at which handle 35 projects from portion 26 of part 15, locking member 14 is interrupted circularly to form a gap g of a circular extent somewhat greater than the corresponding dimension of handle 35, to permit the desired limited pivotal movement of member 14 relative to and about portion 26 of member 15. This pivotal movement is limited in one direction by engagement of a flat surface 55 with the undersurface of handle 35, and in the other direction by engagement of an edge 56 with the upper surface of handle 35 in the broken line position of FIG. 2A.

The radially outer surface of locking member 14 forms a gripping face 57 which is shaped to grip portion 43 of belt 11 progressively more tightly by pivotal movement of member 14 in a counter-clockwise direction relative to member 15 as viewed in FIG. 2. To attain this result, the gripping face is configured to essentially advance progressively closer to axis 25 as the face advances in a counter-clockwise direction in FIG. 2. The gripping face desirably forms a series of teeth 58, 59, 60 and 61 which may be shaped as illustrated in FIG. 2 and have essentially sharp peaks engageable with the belt. These teeth are elongated parallel to axis 25 and may be of uniform cross-section along the entire axial extent of member 14. As will be apparent, the peak of tooth 60 is slightly closer to axis 25 than is the peak of the lowermost tooth 61, the peak of the next upper tooth 59 is slightly closer to axis 25 than is the peak of tooth 60, and the peak of the uppermost tooth 58 is still closer to the axis than tooth 59. Preferably the teeth are disposed essentially eccentrically with respect to axis 25, and more particularly may be shaped to have their peaks all located on a common arc 62 centered about an axis 63 which is offset downwardly from and parallel to pivotal axis 25. Upwardly beyond the top tooth 58, member 14 may have a smoothly curving surface area 64 lying on that same arc 62 with respect to axis 63 and thus disposed the same radial distance R from axis 63 as are the peaks of the various teeth.

In assembling the device, member 14 may first be slipped axially onto portion 26 of actuating member 15, following which member 15 may be snapped into position within member 10 by locating handle 35 just above stop lugs 39, with the pivot pin ends 27 of member 10 located just beneath recesses 30. Portion 26 of member 15 may then be forced upwardly to its FIG. 4 position, to spread the side portions 17 and 18 of member 10 apart and then permit them to return together for pivotal retention of member 15 and the carried part 14 within body member 10. Strap or belt 12 is attached to the left crosspiece 20 as illustrated, and the second belt end 11 is passed about the right crosspiece 21 to the condition of FIG. 2 while handle 35 of member 15 is in its upwardly projecting broken line released position of FIG. 2. The belt end 11 may then be locked against longitudinal movement by swinging the handle 35 leftwardly and downwardly from its broken line position of FIG. 2 to its full line position of that figure, at which position the swinging movement is halted by stop pins 39 and the arm is detented in its position within body 10 and essentially lying in the plane thereof by detent lugs 37. During such swinging movement, the handle 35 engages surface 55 of member 14, to pivot member 14 with member 15 from the broken line position of member 14 illustrated in FIG. 2 to the full line position of that figure. As member 14 approaches the FIG. 2 full line position, the gripping face 57 of member 14, including its smooth surface area 64 and the teeth 58, 59, 60 and 61, engages portion 43 of belt 11 and clamps it tightly against the opposed gripping face 46 of crosspiece 21 of body 10. Such clamping of the belt end between the gripping faces of members 10 and 14 locks the belt against longitudinal movement of its upper portion 42 in a rightward direction. Further, tensional forces exerted on portion 42 of the belt in a rightward direction as viewed in FIG. 2 tend to pivot locking member 14 in a counter-clockwise direction about axis 25 and relative to member 15. This pivotal movement causes the eccentrically disposed teeth to advance progressively closer to gripping face 46, including both of its portions 49 and 50, to thereby enhance the gripping action and attain an automatic self-tightening effect positively assuring against any possibility of release of the locking action. The extent of permitted relative pivotal movement of the part 14 as allowed by the width of gap g is great enough to allow the device to act effectively on and grip belts of different thicknesses, and to evidence the discussed self-tightening effect with each of those different thicknesses. The lock is easily released by merely pushing upwardly on handle 35 to swing it back to its broken line position in which belt end 11 is free for longitudinal movement in either direction or complete removal from the device.

Figure 6:
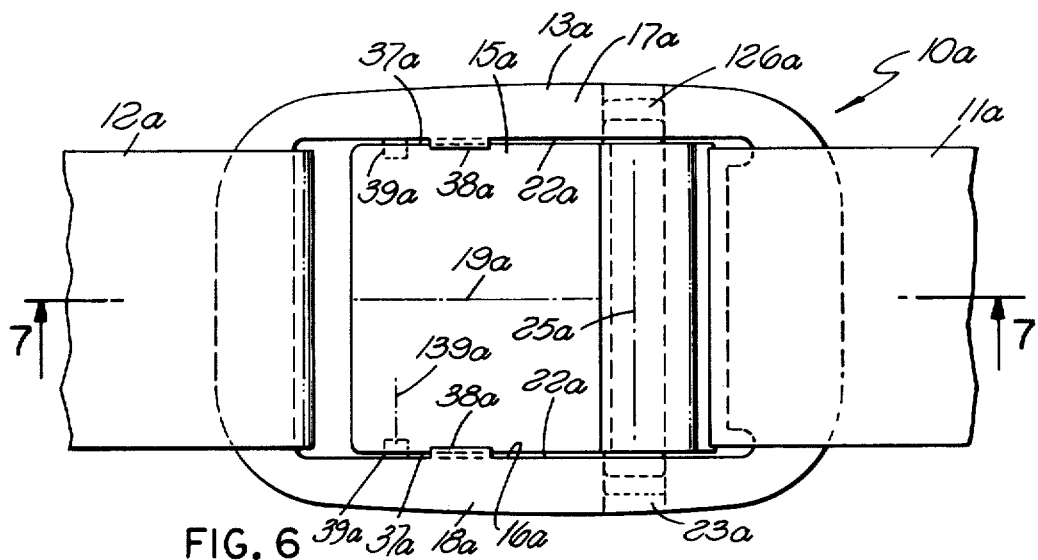
FIG. 6 is a view similar to FIG. 1, but showing a variational form of the buckle embodying the invention.
Figure 7:
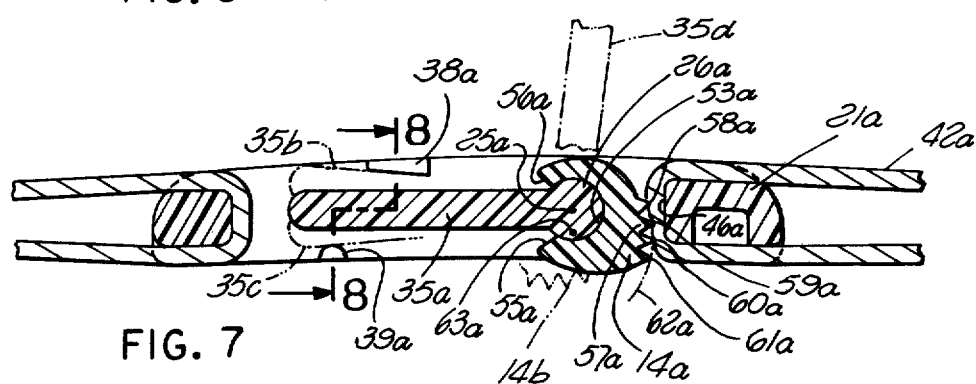
FIG. 7 is a central vertical section taken on line 7—7 of FIG. 6.
Figure 8:
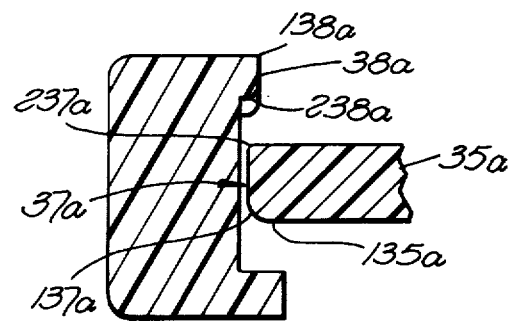
FIG. 8 is an enlarged essentially vertical section taken on line 8—8 of FIG. 7.

In the variational form of buckle illustrated at 10a in FIGS. 6 to 8, the body or yoke 13a is generally very similar to the body 13 of FIGS. 1 to 5, having a first belt end 11a adjustably and detachably connected to its right end, and having a second belt end 12a permanently attached to the left end of body 13a. The actuating member 15a is received within rectangular opening 16a in body 13a in the locked position of this member, and is itself essentially rectangular as viewed in FIG. 1 and dimensioned to extend across almost the entire width of opening 16a. Part 15a has a handle portion 35a for actuating member 15a between the active and released positions of FIG. 7, and also has an externally cylindrical portion 26a forming pivot pins 126a corresponding to pins 126 of the first form of the invention and received within bearing recesses 23a in the sides of body member 13a to mount member 15a for pivotal movement relative to body 13a about axis 25a extending perpendicular to the central longitudinal axis 19a of the device. Pivot pins 126a and the side portions of member 13a may be shaped to permit the pins to be snapped into the bearing recesses during assembly of the device as discussed above.

The locking member 14a contains an internal partial cylindrical recess 53a within which externally cylindrical portion 26a of part 15a is a close fit to mount the locking member 14a for limited pivotal movement about axis 25a relative to member 15a. This pivotal movement is limited by engagement with two end faces 55a and 56a with the undersurface and upper surface respectively of arm 35a of part 15a. As in the first form of the invention, the locking member 14a has a gripping face 57a shaped to advance progressively closer to axis 25a as the face advances in a counterclockwise direction in FIG. 7, and desirably forming a series of teeth 58a, 59a, 60a and 61a, whose peaks are disposed essentially eccentrically with respect to axis 25a, and more particularly are preferably located on a common arc 62a centered about an axis 63a disposed parallel to and spaced directly beneath axis 25a. In the FIGS. 6 to 8 arrangement, the opposed gripping face 46a on the end crosspiece portion 21 of body 13a extends directly vertically through its entire vertical extent, rather than having the two relatively angularly disposed portions 49 and 50 as in FIG. 2. The gripping teeth and surface 46a have the cross-section illustrated in FIG. 7 across the entire width of belt 11a, and are so dimensioned and relatively positioned as to effectively grip belt 11a as locking element 14a turns in a counterclockwise direction as viewed in FIG. 7 and approaches the full line position of that figure.

In order to enable use of the device of FIGS. 6 to 8 with belt material within a wider range of thickness, the device of FIGS. 6 to 8 is constructed to allow some limited movement of actuating arm 35a of member 15a between the position in which member 15a is first detented in its locked condition and the position in which downward swinging movement of member 15a is definitely limited by stop elements. This permitted limited movement is represented by the broken line positions 35b and 35c of handle 35a in FIG. 7. The downward swinging movement of arm 35a is definitely halted by engagement of the underside of handle 35a with two stop pins 39a projecting inwardly from the opposite side portions of body 13a. These pins may have upper cylindrical surfaces which are centered about an axis 139a disposed perpendicular to a vertical plane containing longitudinal axis 19a, and may engage a planar undersurface 135a of handle 35a in a relation definitely preventing any swinging movement of the handle downwardly beyond the broken line position 35c.

The detenting action in FIGS. 6 to 8 is attained by formation of the opposite side portions 17a and 18a of member 13a to have detent lugs 38a projecting inwardly a short distance from the inner vertical parallel surfaces 22a of portions 17a and 18a. These detent lugs 38a project inwardly slightly beyond the locations of the opposite edge surfaces 37a of handle 35a, to require the handle to be slightly forced past the detent lugs 38a attaining a snap action releasably retaining handle 35a against upward swinging movement beyond the position 35b of FIG. 7 unless forced upwardly beyond that position. To cam the side portions 17a and 18a of member 13a slightly apart during downward swinging movement of handle 35a, the side surfaces 37a of handle 35a may have lower rounded portions 137a engageable with detent lugs 38a at 138a during downward movement of the arm. To cam portions 17a and 18a apart during forced upward swinging movement of arm 35a, the lugs 38a may have lower rounded surfaces 238a engageable with the upper portion 237a of side edge surfaces 37a of handle 35a to attain the desired camming action.

In using the device of FIGS. 6 to 8, assume that the arm 35a of member 15a is initially in the upwardly projecting broken line position identified by the number 35d in FIG. 7, with the locking element 14a then being in its released position represented in broken lines at 14b. The belt 11a may then be slipped downwardly between part 14a and surface 46a, following which arm 35a may be swung in a counterclockwise direction downwardly to snap past the detent lugs 38a. During such downward swinging movement of handle 35a, the undersurface of that handle engages surface 55a of locking member 14a to cause it to pivot through a corresponding angle about axis 25a. When the arm has passed detent lugs 38a, the teeth of member 14a are in a position to commence gripping engagement of belt 11a, and to clamp the belt lightly between those teeth and surface 46a. The limited movement permitted of arm 35a between the positions 35b and 35c in FIG. 7 enables this gripping action to commence at an appropriate time regardless of what the thickness of the belt may be within a relatively wide range of permitted thicknesses. After the gripping action has commenced, any subsequent exertion of tensional force on the portion 42a of the belt causes further pivotal movement of locking element 14a about axis 25a and relative to the actuating member 15a, to bring the gripping teeth progressively closer to surface 46a by virtue of the eccentricity of the teeth, and thereby assure an effective and very tight locking action automatically enhanced by tensional forces on the belt. When it is desired to release the belt, arm 35a may be forced upwardly past detent lugs 38a and to the broken line position represented at 35d, to enable belt 11a to be pulled out of the buckle.

While certain specific embodiments of the present invention have been disclosed as typical, the invention is of course not limited to these particular forms, but rather is applicable broadly to all such variations as fall within the scope of the appended claims.

I claim:
1. A buckle comprising:
 a first member having two generally parallel side walls and having a first crosspiece extending between said side walls at one end thereof and attachable to a first elongated element, and a second crosspiece extending between said side walls at their opposite ends and having a gripping surface facing generally toward said first crosspiece;
 an actuating member mounted to said first member for relative swinging movement about an axis between a locking position and a released position;
 said actuating member having an arm which in said locking position is received generally between said two side walls of the first member, and which in said released position swings to a position of extension outwardly from between said side walls;
 said actuating member having a portion at an end of said arm extending between said side walls and projecting into bearing recesses in the side walls to mount the actuating member for said swinging movement;
 said last mentioned portion of the actuating member having an outer partial cylindrical surface centered about said axis and interrupted at the location of said arm; and
 a locking member connected to said actuating member for swinging movement therewith between said locking and released positions and carried about said last mentioned portion of the actuating member for limited pivotal movement relative thereto;
 said locking member having an internal partial cylindrical bearing surface engaging said outer partial cylindrical surface of the actuating member to mount the locking member for said pivotal movement, and being interrupted at the location of said arm with said arm being disposed within the interruption, the width of the interruption being greater than the corresponding dimension of said arm to permit said limited relative pivotal movement;
 said locking member having teeth which progressively increase in radius with respect to said axis in a direction progressively gripping a second elongated element more tightly in response to said limited relative movement of the locking member when said actuating member is in said locking position.

2. A device as recited in claim 1, including detenting means on said arm and at least one of said side walls interengageable to releasably retain said arm against reverse swinging movement toward said released position of the actuating member.

3. A device as recited in claim 1, including stop means on at least one of said side walls of said first member for limiting swinging movement of said arm in the direction of said locking position of the actuating member.

4. A device as recited in claim 1, including detenting means on said arm and at least one of said side walls interengageable to releasably retain said arm against reverse swinging movement toward said released position of the actuating member, and stop means on at least one of said side walls of said first member for limiting swinging movement of said arm in the direction of said locking position of the actuating member.

5. A device for gripping an elongated flexible element and retaining it against longitudinal movement in a predetermined direction, comprising:

a first member having a gripping portion;

an actuating member mounted to said first member for relative swinging movement essentially about an axis between a locking position and a released position;

a locking member connected to said actuating member for swinging movement therewith between said positions, and having a gripping portion which in said locking position of the actuating member is positioned to clamp said elongated element against said gripping portion of said first member and which in said released position of the actuating member releases said element for longitudinal movement in said direction;

said locking member being free for limited pivotal movement relative to said actuating member about an axis when the latter is in said locking position;

said gripping portion of said locking member being constructed to move progressively closer to said gripping portion of said first member and to thereby grip said element progressively more tightly as said locking member pivots relative to said actuating member when the latter is in said locking position;

stop means limiting swinging movement of said actuating member in the direction of said locking position; and detenting means for releasably preventing reverse swinging movement of said actuating member toward said released position;

said actuating member being free for limited swinging movement between positions of engagement with said stop means and said detenting means.

6. A buckle comprising:

a first member having two generally parallel side walls and having a first crosspiece extending between said side walls at one end thereof and attachable to a first elongated element, and a second crosspiece extending between said side walls at their opposite ends and having a gripping surface facing generally toward said first crosspiece;

an actuating member mounted to said first member for relative swinging movement about an axis between a locking position and a released position;

said actuating member having an arm which in said locking position is received generally between said two side walls of the first member, and which in said released position swings to a position of extension outwardly from between said side walls;

said actuating member having a portion at an end of said arm extending between said side walls and projecting into bearing recesses in the side walls to mount the actuating member for said swinging movement;

said last mentioned portion of the actuating member having an outer partial cylindrical surface centered about said axis and interrupted at the location of said arm;

a locking member connected to said actuating member for swinging movement therewith between said locking and released positions and carried about said last mentioned portion of the actuating member for limited pivotal movement relative thereto;

said locking member having an internal partial cylindrical bearing surface engaging said outer partial cylindrical surface of the actuating member to mount the locking member for said pivotal movement, and being interrupted at the location of said arm and engageable with the arm to limit the relative pivotal movement;

said locking member having teeth which progressively increase in radius with respect to said axis in a direction progressively gripping a second elongated element more tightly in response to said limited relative movement of the locking member when said actuating member is in said locking position;

detenting means on said arm and at least one of said side walls interengageable to releasably retain said arm against reverse swinging movement toward said released position of the actuating member; and stop means on at least one of said side walls of said first member for limiting swinging movement of said arm in the direction of said locking position of the actuating member;

said arm being free for limited swinging movement between positions of engagement with said detenting means and said stop means.

7. A device for gripping an elongated flexible element and retaining it against longitudinal movement in a predetermined direction, comprising:

a first member having a gripping portion;

an actuating member mounted to said first member for relative swinging movement essentially about an axis between a locking position and a released position; and a locking member connected to said actuating member for swinging movement therewith between said positions, and having a gripping portion which in said locking position of the actuating member is positioned to clamp said elongated element against said gripping portion of said first member and which in said released position of the actuating member releases said element for longitudinal movement in said direction;

said locking member being received about and carried by a portion of said actuating member and being mounted by said portion of the actuating member for limited pivotal movement relative thereto about said axis when the actuating member is in said locking position; and said gripping portion of said locking member being constructed to move progressively closer to said gripping portion of said first member and to thereby grip said element progressively more tightly as said locking member pivots relative to said actuating member when the latter is in said locking position;

said locking member extending only partially about said portion of the actuating member by which it is pivotally carried and being interrupted circularly at a gap through which said actuating member projects, the width of said gap being greater than the corresponding dimension of said actuating member to permit said limited pivotal movement of the locking member relative to the actuating member.

8. A device as recited in claim 7, in which said locking member has an internal bearing surface centered about said axis and said portion of the actuating member has an external bearing surface centered about said axis and engaging said internal surface of the locking member to mount it for said relative pivotal movement.

9. A device as recited in claim 7, including detenting means for releasably retaining said actuating member against reverse swinging movement to said released position thereof while permitting said pivotal movement of said locking member relative to the actuating member.

10. A device as recited in claim 7, in which said gripping portion of said locking member has a periphery which contacts and grips said element and which essentially decreases in radius with respect to said axis as it advances about said axis in the direction of swinging movement of said actuating member from said released position to said locking position.

11. A device as recited in claim 7, in which said gripping portion of said locking member has a plurality of teeth engageable with said elongated element in gripping relation and having peaks which progressively decrease in radial distance from said axis in the direction in which said locking member pivots relative to said actuating member to tighten the grip on said elongated element.

12. A device as recited in claim 7, including stop means limiting swinging movement of said actuating member in the direction of said locking position.

13. A device as recited in claim 1, including stop means limiting swinging movement of said actuating member in the direction of said locking position and detenting means for releasably preventing reverse swinging movement of said actuating member toward said released position.

14. A device as recited in claim 1, in which said gripping portion of said first member contains a recess opposite side gripping portion of said locking member into which the latter presses said elongated flexible element in said locking position of the actuating member and having a wall of said recess facing generally toward said axis and against which said flexible element is pressed by said locking member.

15. A device as recited in claim 1, in which said gripping portion of said first member has a surface against which said gripping portion of said locking member presses said elongated element and which faces generally toward said axis and advances gradually and progressively toward said axes as it advances circularly about said axis in the direction in which said locking member pivots relative to said actuating member to tighten the grip on said elongated element.

16. A device as recited in claim 1, in which said gripping portion of said locking member has a plurality of teeth engageable with said elongated element in gripping relation and having peaks which progressively decrease in radial distance from said axis in the direction in which said locking member pivots relative to said actuating member to tighten the grip on said elongated element, said gripping portion of said first member containing a recess opposite said gripping portion of the locking member into which the latter presses said elongated element and having a wall of said recess facing generally toward said axis and against which the elongated element is pressed and which advances gradually and progressively toward said axis as said wall advances circularly in said direction in which the locking member pivots to tighten the grip on said elongated element.

17. A device for gripping an elongated flexible element and retaining it against longitudinal movement in a predetermined direction, comprising:

a first member having a gripping portion;
an actuating member mounted to said first member for relative swinging movement essentially about an axis between a locking position and a released position; and
a locking member which swings with said actuating member between said positions, and having a gripping portion which in said locking position of the actuating member is positioned to clamp said elongated element against said gripping portion of said first member and which in said released position of the actuating member releases said element for longitudinal movement in said direction;
means connecting said locking member to said actuating member for said swinging movement therewith and for limited pivotal movement relative to said actuating member about said axis when the latter is in said locking position;
said gripping portion of said locking member having a periphery which contacts and grips said element and which has a portion of maximum radius with respect to said axis and essentially decreases in radius with respect to said axis as it advances about said axis in the direction of swinging movement of said actuating member from said released position to said locking position in a relation causing said gripping part of said locking member to move progressively closer to said gripping portion of said first member and to thereby grip said element progressively more tightly as said locking member pivots relative to said actuating member when the latter is in said locking position.

18. A device as recited in claim 17, in which said periphery of the locking member which engages and grips said elongated element extends essentially eccentrically with respect to said axis.

19. A device for gripping an elongated flexible element and retaining it against longitudinal movement in a predetermined direction, comprising:

a first member having a gripping portion;
an actuating member mounted to said first member for relative swinging movement essentially about an axis between a locking position and a released position; and
a locking member connected to said actuating member for swinging movement therewith between said positions, and having a gripping portion which in said locking position of the actuating member is positioned to clamp said elongated element against said gripping portion of said first member and which in said released position of the actuating member releases said element for longitudinal movement in said direction;
said locking member being received about and carried by a portion of said actuating member and being mounted by said portion of the actuating member for limited pivotal movement relative thereto about said axis when the actuating member is in said locking position; and
said gripping portion of said locking member being constructed to move progressively closer to said gripping portion of said first member and to thereby grip said element progressively more tightly as said locking member pivots relative to said actuating member when the latter is in said locking position;
said actuating member having an arm for swinging said actuating member between said positions thereof and projecting from said portion of the actuating member by which said locking member is carried, said portion of the actuating member having an external bearing surface centered about said axis and interrupted at the location of said arm, said locking member containing an internal bearing surface engageable with and extending about said external bearing surface of the actuating member to mount the locking member for said limited relative pivotal movement, said locking member and said internal bearing surface thereof being interrupted circularly to form a gap through which said arm of the actuating member projects and at which the locking member is engageable with said actuating member, the width of said gap being greater than the corresponding dimension of said actuating member to permit said relative pivotal movement.

20. A device as recited in claim 19, in which said gripping portion of the locking member has a periphery engageable with said elongated element in gripping relation and which extends essentially eccentrically with respect to said axis.

21. A device as recited in claim 19, in which said gripping portion of said locking member includes a series of axially elongated teeth formed on the periphery of said locking member at a location offset circularly from said gap and disposed essentially eccentrically with respect to said axis so that successive teeth have their peaks progressively farther from said axis as the teeth advance in the circular direction in which said actuating arm swings from said locking position to said released position.

* * * * *